（12) United States Patent
Delgado Jareño et al.

(10) Patent No.: US 8,662,451 B2
(45) Date of Patent: Mar. 4, 2014

(54) MANHOLE ASSEMBLY IN THE LOWER SKIN OF AN AIRCRAFT WING MADE OF A COMPOSITE MATERIAL

(75) Inventors: José Luis Delgado Jareño, Madrid (ES); Ignacio Outon Hernández, Madrid (ES)

(73) Assignee: Airbus Operations S.L., Madrid (ES)

( * ) Notice: Subject to any disclaimer, the term of this patent is extended or adjusted under 35 U.S.C. 154(b) by 176 days.

(21) Appl. No.: 13/066,771

(22) Filed: Apr. 25, 2011

(65) Prior Publication Data

US 2012/0187247 A1 Jul. 26, 2012

(51) Int. Cl.
*B64C 1/14* (2006.01)

(52) U.S. Cl.
USPC ..................................... 244/129.4; 244/129.5

(58) Field of Classification Search
USPC ................... 244/119, 129.3–129.5, 121, 120
See application file for complete search history.

(56) References Cited

U.S. PATENT DOCUMENTS

| 2,635,785 | A | * | 4/1953 | Gross | 220/328 |
| 5,014,934 | A | * | 5/1991 | McClaflin | 244/132 |
| 5,316,167 | A | * | 5/1994 | Kay | 220/328 |
| 7,080,807 | B2 | * | 7/2006 | Olson et al. | 244/129.3 |
| 7,576,966 | B2 | * | 8/2009 | Heeter | 361/215 |
| 8,141,820 | B2 | * | 3/2012 | Zuniga Sagredo | 244/129.4 |
| 8,443,575 | B1 | * | 5/2013 | Tanner et al. | 52/784.1 |
| 2007/0207421 | A1 | * | 9/2007 | Heeter | 431/22 |
| 2009/0166473 | A1 | * | 7/2009 | Zuniga Sagredo | 244/129.4 |
| 2009/0294591 | A1 | * | 12/2009 | Ramirez Blanco et al. | 244/129.4 |

* cited by examiner

*Primary Examiner* — Philip J Bonzell
(74) *Attorney, Agent, or Firm* — Paul Bogdon

(57) ABSTRACT

A manhole assembly in the lower skin (37) of an aircraft wing made of a composite material for giving access to an installation placed inside said aircraft wing such as a fuel tank, comprising an inner cover (31) and an outer cover (33) joined by first fastener means (35); the lower skin (37) being configured with a rebated edge (45) around the manhole so that the outer cover (33) can be mounted over the lower skin (37) maintaining the aerodynamic continuity in the aircraft wing surface; the inner cover (31) being mounted over the lower skin (37) by its inner surface with a sealing profile (41) between them and being joined to the lower skin (37) by second fastener means (47).

6 Claims, 2 Drawing Sheets

MANHOLE ASSEMBLY IN THE LOWER SKIN OF AN AIRCRAFT WING MADE OF A COMPOSITE MATERIAL

FIELD OF THE INVENTION

The invention relates to a manhole assembly in the lower skin of an aircraft wing made of a composite material and more in particular to a manhole assembly for a fuel tank.

BACKGROUND OF THE INVENTION

The openings in aircraft skins giving access to internal installations are usually referred to as manholes and their covers are commonly referred to as manhole covers or doors.

A manhole assembly for a fuel tank located in an aircraft wing must meet the following general requirements:
- its size must be in accordance with accessibility requirements;
- the manhole cover must be sealed for preventing fuel lass;
- impact requirements must be met;
- the assembly and disassembly of covers must be as quick and as easy as possible;
- the covers must be changeable.

For metallic wings a typical manhole assembly comprise a suitable dimensioned opening, an inner cover in the fuel tank and an outer cover in the wing surface. The inner and outer covers are joined by means of screws such that they secure the wing skin between them and the resulting pressure on the surrounding surface seals the whole cover through the action of sealing profiles. To maintain the aerodynamic continuity a rebate is machined on the skin edge so that the outer cover can be mounted over the skin rebated edge.

FIGS. 1 and 2 show a typical manhole assembly for a metallic wing lower skin. An inner cover 11 is located inside the fuel tank and an outer cover 13 is located on the wing surface. The inner and outer covers 11, 13 are joined by means of screws 15 clamping between them the metallic skin 17. Two sealing profiles 21, 23 are arranged at the ends of the inner and outer covers 11, 13 so that the screws pressure on the surrounding surface seals the whole cover. A rebate 25 is machined in the edge of the metallic skin 17 to mount the outer cover 13 over the skin for maintaining the aerodynamic continuity in the wing surface.

This prior art solution is not directly applicable to wings made of composite material, especially CFRP (Carbon Fiber Reinforced Plastic)—a recent event in the aeronautical industry—so that they need new manhole assemblies.

Patent applications WO 2009/003954 and WO 2009/083575 in the name of the applicant disclose two proposals in this respect.

WO 2009/003954 discloses a manhole assembly comprising the following elements: an outer and an inner cover; an adjusting washer between the inner cover and the skin; sealing profiles between the inner cover and the adjusting. washer and between the outer cover and the skin; a plate between the skin and the outer cover; the inner and outer cover being joined by means of screws such that they secure the wing skin between them.

WO 2009/083575 discloses a manhole assembly comprising an outer and inner cover, stringers attached to the skin whose edges are positioned so that the outer and inner covers are clamped on the foot of the stringer and are joined by means of screws and the outer cover is aligned with the skin for maintaining the aerodynamic continuity in the wing surface.

While these proposals solve the problem raised by aircraft wings of composite material for certain manholes, there is still a demand of a manhole assembly able to satisfy all the requirements of a manhole giving access to an installation placed inside an aircraft wing made of composite material.

The present invention is aimed at satisfying this demand.

SUMMARY OF THE INVENTION

One object of the present invention is to provide a manhole assembly in the lower skin of an aircraft wing made of a composite material for giving access to an installation placed inside said aircraft wing, such as a fuel tank, that can be able to comply with the Electromagnetic Hazard (EMH) and corrosion requirements as well as with the structural requirements.

Another object of the present invention is to provide a manhole assembly in the lower skin of an aircraft wing made of a composite material for giving access to an installation placed inside said aircraft wing, such as a fuel tank, applicable for manhole covers made of a metallic or a composite material.

These and other objects are met by a manhole assembly in which:
- the inner cover and the outer cover are joined by first fastener means;
- the lower skin is configured with a rebated edge around the manhole so that the outer cover can be mounted over the lower skin maintaining the aerodynamic continuity in the aircraft wing surface;
- the inner cover is mounted over the lower skin by its inner surface with a sealing profile between them and is joined to the lower skin by second fastener means.

In a preferred embodiment the manhole assembly also comprises an is intermediate part between the inner cover and the lower skin. Hereby it is achieved a suitable manhole assembly for different locations of the manhole in the wing lower skin.

In another preferred embodiment said second fastener means are a plurality of rivets around the manhole. Hereby it is achieved a manhole assembly with efficient means for fastening the inner cover to the wing skin.

In another preferred embodiment said rivets are installed leaving a gap with the bore made in the joined parts. Hereby it is achieved a manhole assembly with suitable fastening means between the wing skin and the inner cover for decreasing the loads carried by the inner cover due to the deformations of the wing lower skin.

In another preferred embodiment the outer cover is made of a metallic material and the assembly also includes a dielectric layer between the contacting areas of the outer cover and the lower skin. Hereby it is achieved a manhole assembly duly protected.

Other characteristics and advantages of the present invention will be clear from the following detailed description of embodiments illustrative of its object in relation to the attached figures.

DETAILED DESCRIPTION OF THE INVENTION

In addition to the general requirements of any manhole assembly in an aircraft surface, a manhole assembly in a wing lower skin made of a composite material, particularly a manhole assembly for a fuel tank, must meet specific Electromagnetic Hazard (EMH) and corrosion requirements.

On the other hand, it is desirable a manhole assembly where the inner and outer covers can be made of a metallic material as well as of a composite material.

Figure 1:
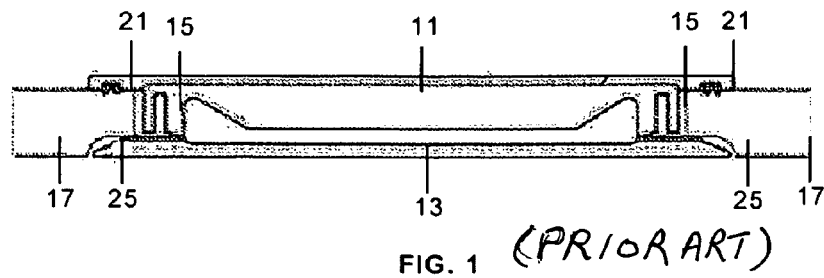
FIG. 1 shows a prior art manhole assembly in a metallic aircraft wing.
Figure 2:
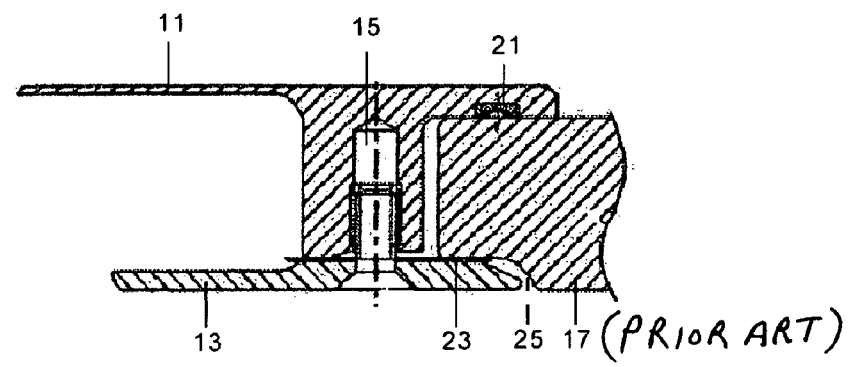
FIG. 2 is a partial cross sectional view of said manhole assembly.
Figure 3:
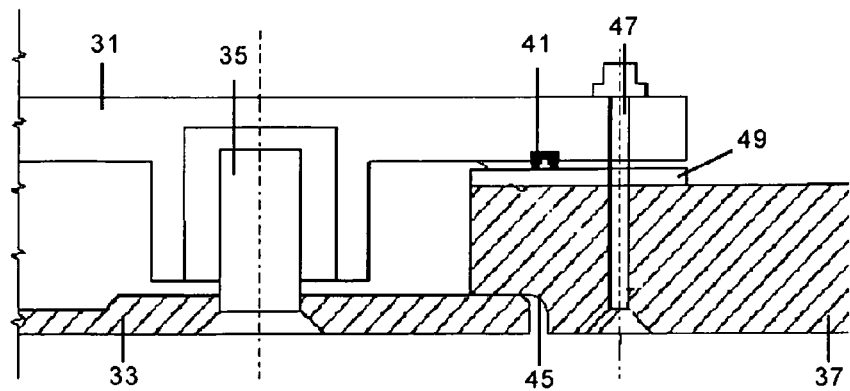
FIG. 3 is a cross sectional view of a manhole assembly in a composite aircraft wing according to the present invention.
Figure 4:
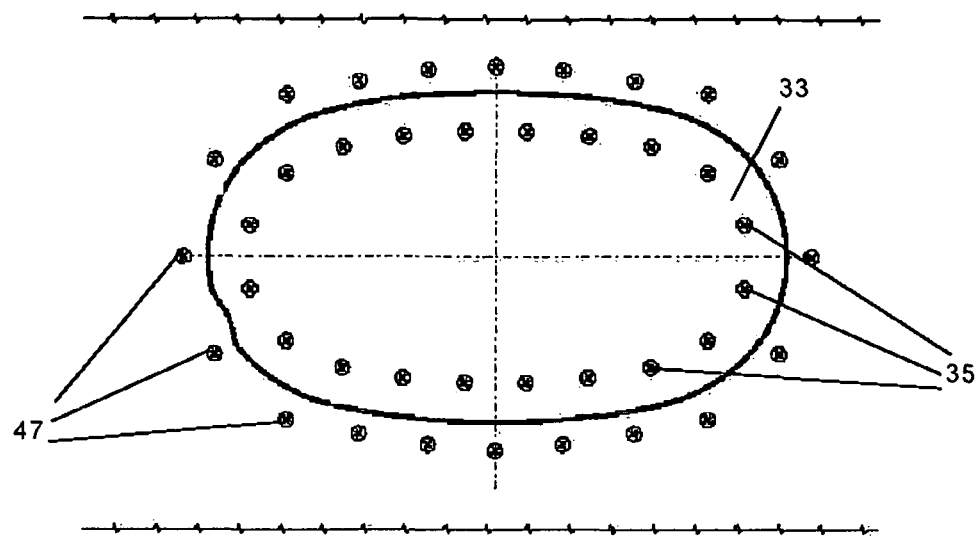
FIG. 4 is a plan view of a manhole assembly in a composite aircraft wing according to the present invention.
Figure 5:
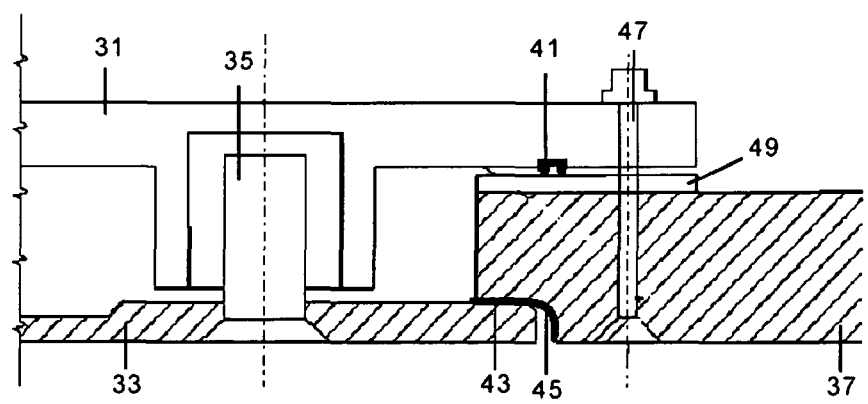
FIG. 5 is a cross sectional view of a manhole assembly in a composite aircraft wing in a preferred embodiment of the present invention.

FIGS. 3 and 4 show a manhole assembly according to the present invention that comply with said requirements and comprise:

- An inner cover 31 and an outer cover 33 joined by first fastener means 35 such as screws.
- A wing lower skin 37 configured with a rebated edge 45 around the manhole so that the outer cover 33 can be mounted over the wing lower skin 37 on said rebated edge 45 maintaining the aerodynamic continuity in the aircraft wing surface.
- If needed, an intermediate part 49 between the inner cover 31 and the lower skin 37. This intermediate part 49 may be whether an stringer foot close to the manhole or an ad-hoc intermediate part for adjustment purposes.
- A joining arrangement between the inner cover 31, the intermediate part 49 (if present) and the lower skin 37 using second fastener means 47 such as rivets with the corresponding countersinking.
- At least a sealing profile 41 between the inner cover 31 and the wing lower skin 37 or the intermediate part 49, if present.

In the prior art it was considered that making a rebated edge in a skin made of a composite material, particularly CFRP, was not feasible. However, new manufacturing procedures allowing the configuration of a wing lower skin with a rebated edge around a manhole seem now to be available. Therefore the manhole assembly according to the invention keeps the wing lower skin 37 clamped between the inner and outer covers 31, 33 which is a convenient arrangement for a manhole assembly for an installation such as a fuel tank which is subjected to impacts such as tyre debris impacts and to the loads due to the deformations of the wing lower skin 37.

The manhole assembly according to the present invention includes said second fastening means 47, on one side, for achieving a fail-safe manhole assembly and, on the other side, because said fastening means 47 contribute to comply with the EMH requirements avoiding that spark/outgassing (after lightning strike) can pass to the fuel tank.

In a preferred embodiment said second fastening means 47 are installed leaving a gap with the bore in the joined parts for decreasing the loads carried by the inner cover 31 due to the deformations of the wing lower skin 37 and also for facilitating the manhole mounting/dismounting.

The manhole assembly according to the present invention is applicable to inner and outer covers 31, 33 made of a composite material or of a metallic material.

If the outer cover 33 is made of a metallic material, the manhole assembly also includes, as shown in FIG. 4, a dielectric layer 43 between the outer cover 33 and the wing skin 37.

Although the present invention has been fully described in connection with preferred embodiments, it is evident that modifications may be introduced within the scope thereof, not considering this as limited by these embodiments, but by the contents of the following claims.

The invention claimed is:

1. A manhole assembly in the lower skin (37) of an aircraft wing made of a composite material for giving access to an installation placed inside said aircraft wing, comprising:
   an inner cover (31);
   an outer cover (33) joined to the inner cover (31);
   first fastener means (35) for joining the inner cover (31) to the outer cover (33);
   a lower skin (37) configured with a rebated edge (45) around a manhole such that the outer cover (33) is mounted over the lower skin (37) to maintain the aerodynamic continuity in the surface of the aircraft wing;
   a sealing profile (41) mounted between the inner cover (31) and the lower skin (37); and
   second fastener means (47) for joining the inner cover (31) to the lower skin (37); said second fastener means including a plurality of fasteners such as rivets installed around the manhole in a manner to define a gap between the inner cover (31) and the lower skin (37).

2. The manhole assembly of claim 1, wherein the installation is a fuel tank.

3. The manhole assembly of claim 1, further comprising an intermediate part (49) between the inner cover (31) and the lower skin (37).

4. The manhole assembly of claim 1, wherein the outer cover (33) comprises a composite material.

5. The manhole assembly of claim 1, wherein the outer cover (33) comprises a metallic material 6. The manhole assembly of claim 5, further comprising a dielectric layer (43) between the contacting areas of the outer cover (33) and the lower skin (37).

* * * * *